Figure 5:
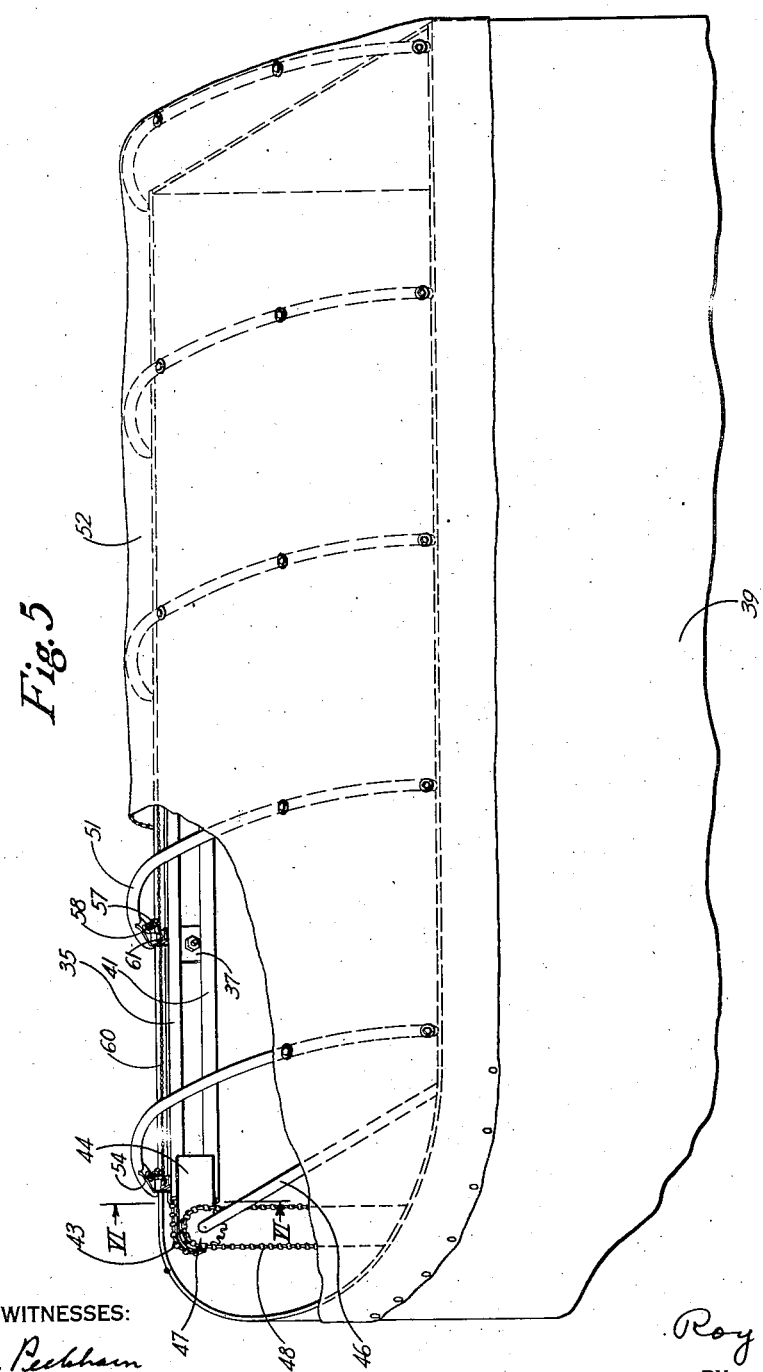

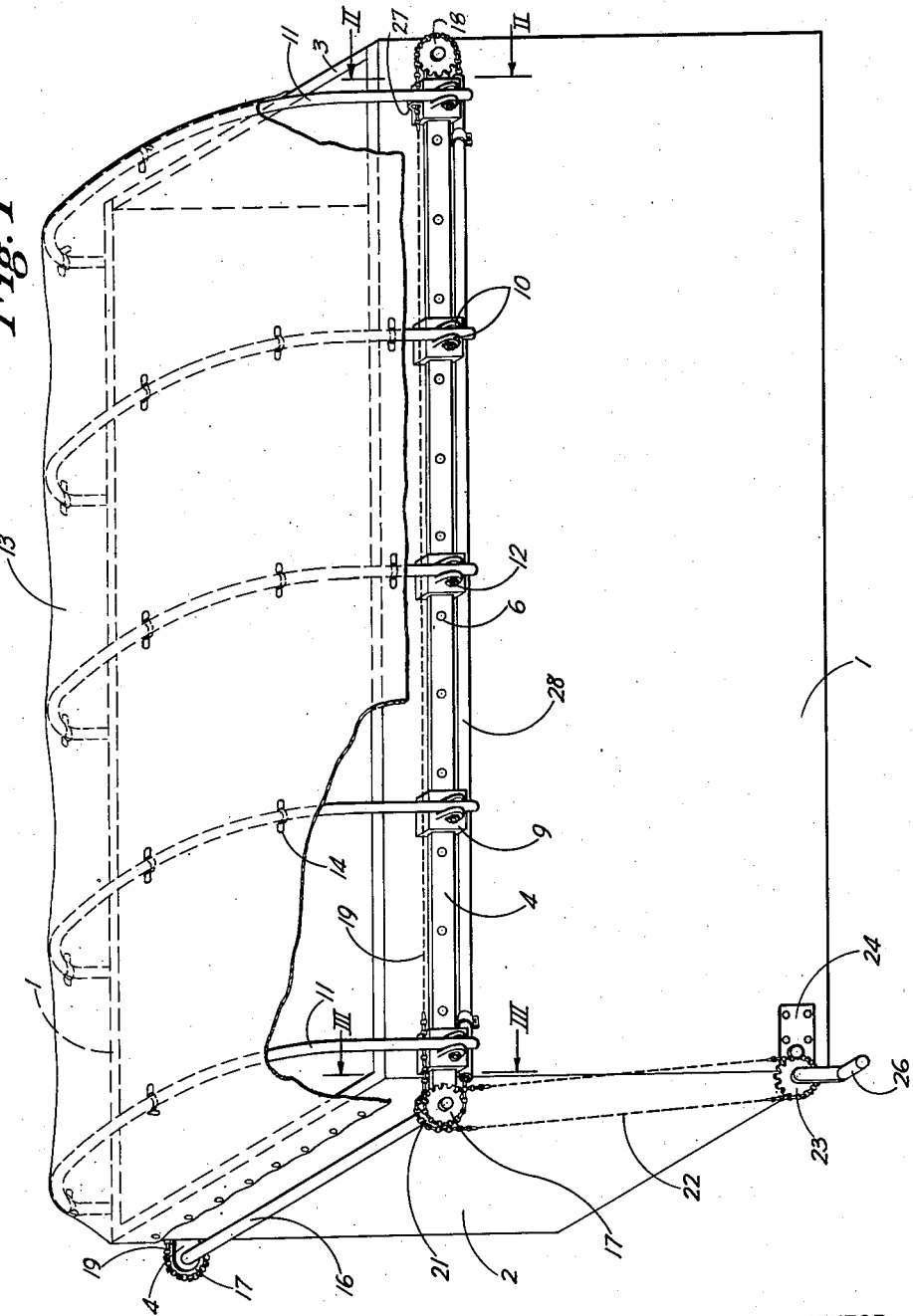

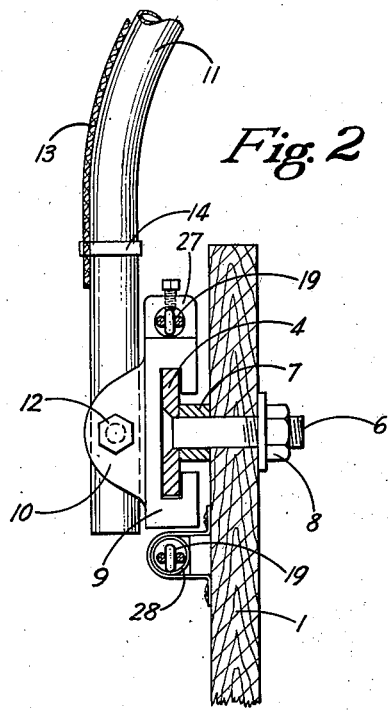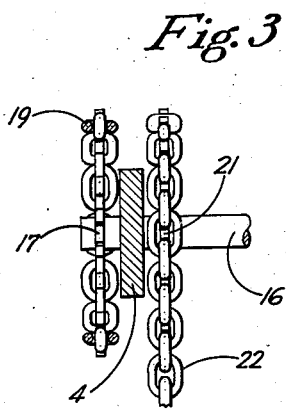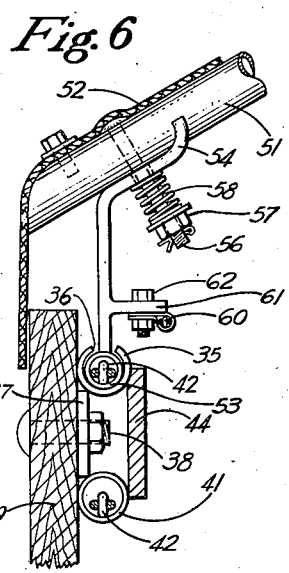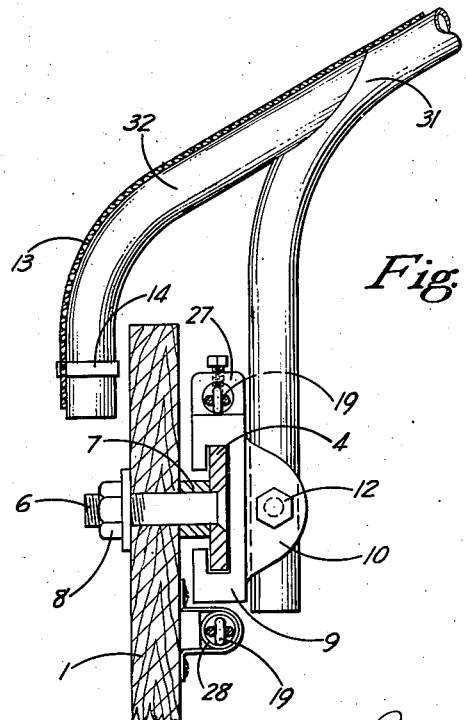

May 10, 1949.   R. H. FOWLER   2,469,958
MOTOR VEHICLE COVER
Filed Jan. 18, 1946   3 Sheets-Sheet 3

WITNESSES:
V. A. Beckham
E. O. Johns

INVENTOR
Roy H. Fowler
BY
Brown, Critchlow & Flick
his ATTORNEYS

Patented May 10, 1949

2,469,958

UNITED STATES PATENT OFFICE 2,469,958

MOTOR VEHICLE COVER

Roy H. Fowler, Beaver Falls, Pa.

Application January 18, 1946, Serial No. 641,881

3 Claims. (Cl. 296—105)

1

This invention relates to motor vehicle covers and more particularly to tarpaulins for covering truck bodies and trailers.

It is among the objects of this invention to provide a motor vehicle cover which can be extended or collapsed in order to cover or to uncover the vehicle, which can be operated from one end of the vehicle, which is dependable in operation, and which is relatively simple and inexpensive in construction.

In accordance with this invention a pair of spaced horizontal rails are mounted on opposite sides of a truck body or a truck trailer. Slidably mounted on each of these rails is a plurality of normally spaced supporting members or brackets. Parallel ribs arch up over the space between the rails and have their ends supported by the brackets. These ribs support a tarpaulin which is attached to them. Extending lengthwise of the rails are endless means, such as endless chains, which are fastened to the brackets at one end of the rails. Means is provided for driving the chains so that they will slide the brackets to which they are connected toward the opposite end of the rails in order to move all the ribs toward that end to uncover the vehicle. The driving means may include a manually operable crank for turning the sprockets that support the chains. The rails may be mounted on either the inside or the outside of the vehicle body.

The invention is illustrated in the accompanying drawings in which Fig. 1 is a perspective view of a truck or trailer body provided with my cover; Fig. 2 is an enlarged fragmentary vertical section taken on the line II—II of Fig. 1; Fig. 3 is an enlarged fragmentary vertical section taken on the line III—III of Fig. 1; Fig. 4 is a view similar to Fig. 2 showing a modification of the invention; Fig. 5 is a fragmentary perspective view of a further modification; and Fig. 6 is an enlarged vertical section taken on the line VI—VI of Fig. 5.

Referring to Fig. 1 of the drawings, the body of a truck or trailer has parallel side walls 1 connected at the front end by an end wall 2 and spanned at the rear end by a gate 3. Extending horizontally along the outer surface of each side wall is a rail 4 which projects a short distance from the front end of the body. As shown in Fig. 2, the two rails are connected to side walls 1 by means of bolts 6 which have countersunk heads and which carry spacers 7 that space the rails from the side walls. Nuts 8 on the inner ends of the bolts fasten them to the body.

Slidable longitudinally of each rail is a series of brackets 9 each of which has a C-shape body

2 which holds it on the rail, as shown in Fig. 2, and a pair of spaced vertical lugs 10 projecting from the outer surface of the body. The brackets on each rail are disposed opposite to those on the other rail so as to form cooperating pairs of brackets.

Disposed in the spaces between the lugs on each of these pairs of brackets 9 are the ends of a rib 11 which arches over the space between the side walls of the truck body. These ribs can be made from curved pipes. They are connected to the brackets by means of horizontal bolts 12 that extend through aligned transverse openings in the lugs and ribs. Normally the brackets and the ribs that they support are spaced apart equal distances lengthwise of the rails. The ribs support a tarpaulin 13 which is attached to them in any suitable manner, such as by clips 14. The tarpaulin is wide enough to overlap the sides of the truck body, and the front end of the tarpaulin is fastened to the front end of the body.

It is a feature of this invention that all of the ribs can be moved toward one end of the truck body in order to collapse the tarpaulin to uncover the body. Accordingly, a horizontal shaft 16 is journaled in the projecting front ends of rails 4, and sprockets 17 are rigidly mounted on opposite ends of this shaft. Similar sprockets 18 are rotatably supported by the rear ends of the rails, and an endless chain 19 extends along each rail and around the sprockets supported by it. As shown in Figs. 1 and 3, another sprocket 21 is rigidly mounted on shaft 16 near one end where it supports an endless chain 22 that also extends around a sprocket 23 carried by a projecting plate 24 attached to the lower front corner of the truck body. This lower sprocket can be turned by a crank 26 so that shaft 16 and the sprockets 17 on its ends will be turned. This causes the chains to travel along the rails. These chains are connected to the pair of brackets 9 at the rear end of the rails by means of lugs 27 projecting above those two brackets. The rest of the upper strand of each chain rests loosely on the remaining brackets, while the lower strand of the chain may be supported by a horizontal tube 28 mounted on the side of the body below the adjacent rail.

When it is desired to uncover the truck body the crank 26 at the front is turned in a counterclockwise direction. This causes the upper strands of chains 19 to move forward and to slide the rear pair of brackets 9 forward along the rails with them. These brackets strike a pair of brackets in front of them, the former push the latter forward until they strike the next pair, and so on until all of the brackets and ribs are grouped together at the front end of the body. The tarpaulin, being flexible, collapses or folds up as this occurs. It can be extended over the body again by merely turning the crank in a clockwise direction so that the rear rib will be pulled by the chains connected to it toward the rear ends of the rails. As soon as the section of the tarpaulin between the rear rib and the next rib is pulled taut, this section will pull the second rib along with the first one. This continues from rib to rib until the tarpaulin has been fully extended again. If the truck body sides should be bulged out in such a way as to tilt brackets 9, this will not cause the ribs to make the brackets bind on the rails, because bolts 12 will permit the brackets to pivot relative to the ribs.

In some cases it may be desirable to mount rails 4 inside the truck or trailer body, especially when the body has a rounded front end. In such a case the shaft 16 at the front end of the rails and the chain 22 through which the crank turns it, likewise are mounted inside the body. It is desirable, however, that the lower side edges of the tarpaulin extend out over the tops of side walls 1 of the body. Therefore, as shown in Fig. 4, the tarpaulin-supporting ribs 31 are provided with lateral extensions 32 that project outwardly and downwardly outside of the body. The side edges of the tarpaulin are supported by these extensions, so that it will overlap the side walls of the body.

In case the truck or trailer has merely a floor with no side walls, the rails 4 can be attached to the opposite side edges of the floor, and the ribs will arch up over the floor to provide support for a low tarpaulin covering over it.

The modification shown in Figs. 5 and 6 utilize tubular rails each of which may be formed from a tube 35 having a slot 36 extending lengthwise of its upper surface. The tubular rails are welded to horizontally spaced vertical plates 37 which are connected by bolts 38 to the inside of the truck or trailer side walls 39. Other horizontal pipes 41 may be welded to the lower edges of these plates to support the lower strands of the endless chains 42 that extend through the rails. These chains pass around sprockets 43 supported by extension plates 44 welded to the opposite ends of the pipes. The two sprockets at the front ends of the rails are mounted rigidly on a connecting shaft 46. A third sprocket 47 rigidly mounted on this shaft carries a chain 48 which passes around a drive sprocket (not shown) rotatably mounted in the lower part of the body. The drive sprocket can be turned by a removable crank which can be inserted in an opening through the side of the body.

Extending across the top of the body is a plurality of arched parallel ribs 51 by which a tarpaulin 52 is supported above the body. The ends of these ribs are connected to supporting members which are mounted on the rails. Each supporting member has a base made from a short pipe section 53 which is slidably mounted inside one of the tubular rails 35. Projecting from this pipe section up through the slot in the rail is an angle members 54 the upper leg of which extends along the bottom of the adjacent rib and has a bifurcated upper end straddling the rib. This leg and the rib are provided with aligned openings, one of which is oversize, through which a bolt 56 extends for connecting the two together. Between the angle member and the nut 57 on the bolt there is a compressed coil spring 58 which holds the rib firmly against the angle member, but which allows relative movement between them when necessary in order to keep the supporting members from binding in the tubular rails.

The chains 42 extend through the pipe sections 53 of the supporting members and are rigidly connected in any suitable manner to the supporting members at the rear end of the rails so that they will be pulled forward or backward along the rails when the chains are driven. To take the strain off the tarpaulin while it is being extended over the vehicle body, the rib-supporting members may be connected by flexible tension members, such as chains 60, which pull the ribs away from one another as the pipe sections 53 are pulled rearwardly in tubes 35 by chains 42. The tension chains 60 are connected by bolts 62 to lugs 61 secured to the angle members 54.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A motor vehicle cover comprising a pair of spaced horizontal rails adapted to be mounted on opposite sides of a vehicle, each of said rails being in the form of a tube having a slot extending lengthwise of its top, a plurality of normally spaced short pipe sections slidably mounted inside each tube, endless chains extending lengthwise through the tubes and pipe sections, said chains being connected to said pipe sections at one end of the tubes, parallel ribs extending across the space between the rails, brackets connected to said pipe sections and extending through said tube slots, said brackets supporting the ends of the ribs and provided with bifurcated ends straddling the ribs, fastening members extending through the ribs and brackets for connecting the ribs to said brackets, a tarpaulin supported above said space by the ribs to which it is attached, and means for moving the chains lengthwise of the tubes to slide said pipe sections toward one end of the tubes for moving the tarpaulin-supporting ribs toward that end to uncover the vehicle.

2. A vehicle cover comprising a pair of spaced horizontal rails each in the form of a tube having a slot extending lengthwise of it, a plurality of normally spaced short pipe sections slidably mounted inside of each rail, a substantially horizontal pipe below each rail, vertical plates rigidly connecting the pipes to the rails above them and adapted to be mounted on opposite sides of a vehicle, a bracket secured to the side of each pipe section and extending out through the slot in the adjoining rail, the thickness of said bracket being materially less than the width of the slot to permit the adjoining pipe section and rail to turn relative to each other, parallel ribs extending across the space between the rails and overlapping the upper surfaces of the outer ends of said brackets, said overlapping ends of the ribs and brackets being provided with aligned openings extending transversely and downwardly therethrough, a fastening member extending through each pair of said aligned openings for flexibly connecting a rib and bracket together, a tarpaulin supported above said space by the ribs to which it is attached, bearing members rigidly connected to the opposite ends of said rails, sprockets rotatably mounted in said bearing members, endless chains extending around the sprockets, each chain having an upper strand extending lengthwise through the adjacent rail and the pipe sections therein and having a lower strand extending through the pipe below, the upper strands of the chains being connected to said pipe sections at one end of the rails, and means for turning the sprockets to cause the chains to slide said pipe sections toward one end of the rails for moving the tarpaulin-supporting ribs toward that end to uncover the vehicle.

3. A motor vehicle cover comprising a pair of spaced horizontal rails adapted to be mounted on opposite sides of a vehicle, each of said rails being in the form of a tube having a slot extending lengthwise of its top, a plurality of normally spaced short pipe sections slidably mounted inside each tube, endless chains extending lengthwise through the tubes and pipe sections, said chains being connected to said pipe sections at one end of the tubes, parallel ribs extending across the space between the rails, brackets connected to the tops of said pipe sections and extending through said tube slots and upwardly above the tubes, the upper portions of the brackets supporting the ends of the ribs, fastening members extending through the ribs and brackets to connect them together, laterally projecting lugs connected to the sides of the brackets above the tubes, tension members connecting the lugs and held thereby beyond the side of the underlying tube, a tarpaulin supported above the space between the rails by means of the ribs to which it is attached, and means for moving the chains lengthwise of the tubes to slide said pipe sections toward one end of the tubes for moving the tarpaulin-supporting ribs toward that end to uncover the vehicle.

ROY H. FOWLER.

REFERENCES CITED

The following references are of record in the file of this patent:

UNITED STATES PATENTS

| Number | Name | Date |
|---|---|---|
| 1,263,759 | Hanaway | Apr. 23, 1918 |
| 1,613,273 | Hamilton | Jan. 4, 1927 |
| 1,627,716 | Teachout | May 10, 1927 |
| 1,827,059 | Woolcott | Oct. 13, 1931 |
| 1,863,957 | Woolcott | June 21, 1932 |
| 1,899,832 | Steinecke | Feb. 28, 1933 |

FOREIGN PATENTS

| Number | Country | Date |
|---|---|---|
| 283,567 | Great Britain | May 31, 1928 |
| 294,341 | Great Britain | July 26, 1928 |
| 330,391 | Great Britain | June 12, 1930 |